United States Patent
Calabro et al.

(10) Patent No.: US 7,742,699 B2
(45) Date of Patent: Jun. 22, 2010

(54) METHOD AND ARRANGEMENT FOR THE OPTICAL TRANSMISSION OF DATA SIGNALS VIA DIFFERENTIAL PHASE MODULATION IN A POLARIZATION MULTIPLEX METHOD

(75) Inventors: Stefano Calabro, München (DE); Ernst-Dieter Schmidt, Feldkirchen-Westerham (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 552 days.

(21) Appl. No.: 11/663,042

(22) PCT Filed: Sep. 20, 2005

(86) PCT No.: PCT/EP2005/054685
§ 371 (c)(1), (2), (4) Date: Mar. 16, 2007

(87) PCT Pub. No.: WO2006/034975
PCT Pub. Date: Apr. 6, 2006

(65) Prior Publication Data
US 2007/0297796 A1    Dec. 27, 2007

(30) Foreign Application Priority Data
Sep. 28, 2004    (DE) .................. 10 2004 047 028

(51) Int. Cl.
*H04B 10/04* (2006.01)
*H04J 14/06* (2006.01)
(52) U.S. Cl. .......................... 398/65; 398/184; 398/188

(58) Field of Classification Search .............. 398/65, 398/184, 188
See application file for complete search history.

(56) References Cited

U.S. PATENT DOCUMENTS
2004/0081470 A1    4/2004    Griffin
2004/0184819 A1    9/2004    Vassilieva et al.
2005/0286904 A1    12/2005    Calabro et al.

FOREIGN PATENT DOCUMENTS
DE    102 43 141 A1    4/2004
WO    2004028046    *    4/2004

OTHER PUBLICATIONS

Jin Wang and Joseph M. Kahn, "Conventional DPSK Versus Symmetrical DPSK: Comparison of Dispersion Tolerances", IEEE Photonics Technology Letters, vol. 16, No. 6, Jun. 2004, pp. 1585-1587.

Aviv Salamon, et al., "Secure Optical Communications Utilizing PSK Modulation, Polarization Multiplexing and Coherent Digital Homodyne Detection with Wavelength and Polarization Agility", 2003 IEEE Military Communications Conference, MIILCOM 2003, Boston, MA, Oct. 13-16, 2003, vol. 2 of 2, pp. 274-282.

* cited by examiner

*Primary Examiner*—Leslie Pascal
(74) *Attorney, Agent, or Firm*—Dickinson Wright PLLC

(57) ABSTRACT

Two data signals are subjected to a binary differential phase modulation and transmitted as POLMUX multiplex signals. The types of modulation are selected in such a way that they are orthogonal in relation to each other and do not influence each other during the demodulation of the signals. There is thus no need to regulate the polarization on the receiving side.

8 Claims, 3 Drawing Sheets

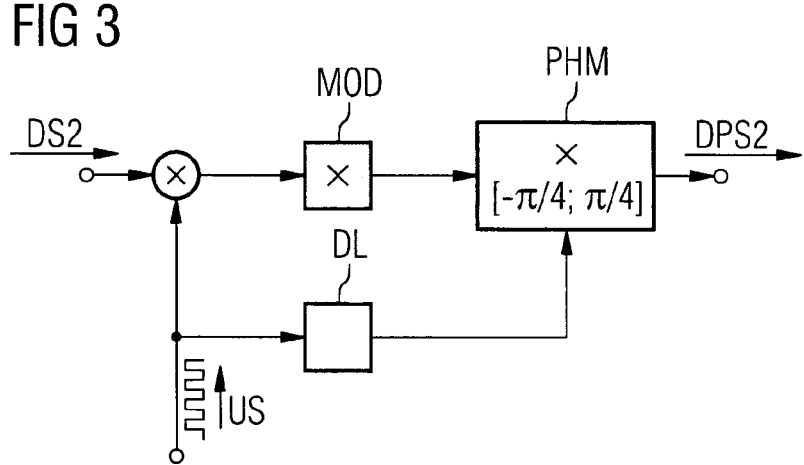
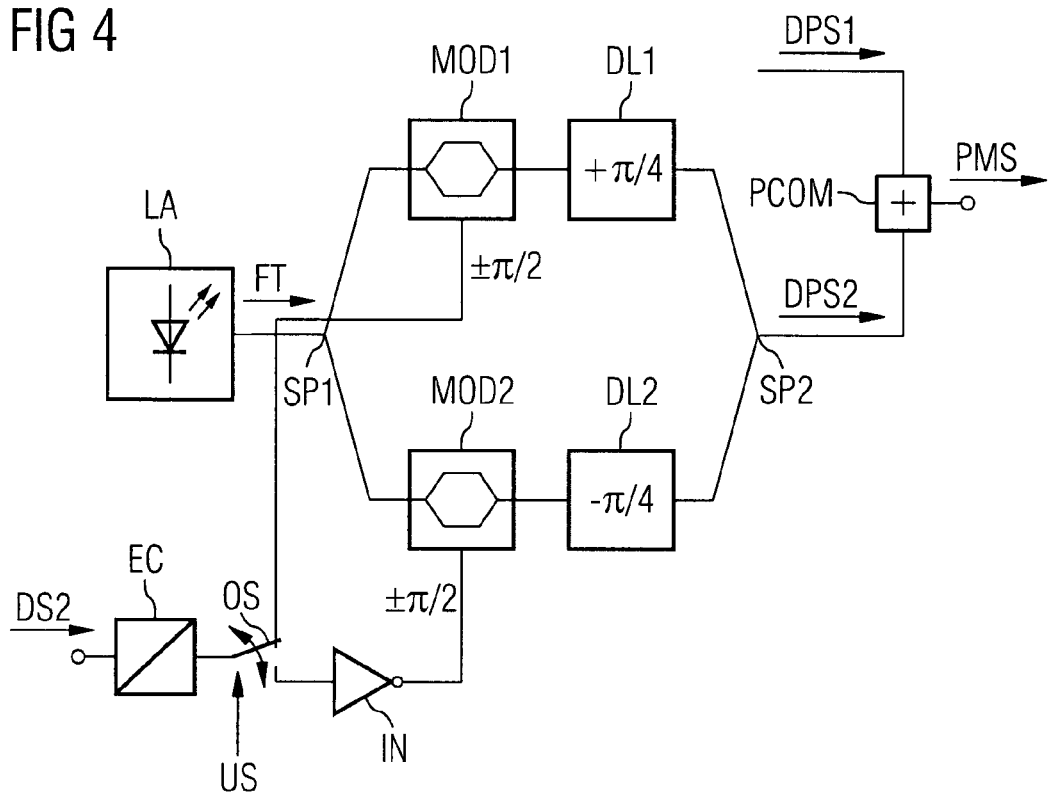

METHOD AND ARRANGEMENT FOR THE OPTICAL TRANSMISSION OF DATA SIGNALS VIA DIFFERENTIAL PHASE MODULATION IN A POLARIZATION MULTIPLEX METHOD

CROSS REFERENCE TO RELATED APPLICATIONS

This application is the US National Stage of International Application No. PCT/EP2005/054685, filed Sep. 20, 2005 and claims the benefit thereof. The International Application claims the benefits of German application No. 102004047028.6 DE filed Sep. 28, 2004, both of the applications are incorporated by reference herein in their entirety.

FIELD OF INVENTION

The invention relates to a method and to arrangements for the optical transmission of data signals via differential phase modulation in a polarization multiplex method.

SUMMARY OF INVENTION

A method suitable for the transmission of optical signals in which two different data signals are transmitted in polarization planes which are orthogonal with respect to one another is referred to as a polarization multiplex method (POLMUX). The technology commonly in use today employs adjustable polarization controllers with polarization filters connected downstream which allow optimum separation of the signals in both polarization planes. Such a method is however quite complicated and has a greater hardware resource requirement on the receive side.

In patent application DE 102 43 141 A1 a method is described for the transmission of two four-stage phase-modulated DQPSK signals in the polarization multiplex method. The modulated DQPSK signals are separated on the receive side by means of a polarization splitter. Following a compensation operation on the DQPSK signals, the conversion into binary signals takes place. A multi-dimensional filter is used for the compensation operation.

In the article "Secure optical communication utilizing PSK modulation, wavelength and polarization agility", 2003 IEEE Military Communications Conference, MILCOM 2003, Boston, Mass., October 13-16, Aviv Salamon et al. describe a system essentially corresponding to the previously mentioned method, but restrict themselves therein to QPSK (four-stage) phase modulation.

In the article "Conventional DPSK Versus Symmetrical DPSK: Comparison of Dispersion Tolerances" by Jin Wang in IEEE Photonics Technology Letters; Vol. 16, No. 6, Jun. 2004, pages 1585 to 1587, a comparison between conventional DPSK phase states 0 and $\pi$ and symmetrical DPSK with the phase states $\pi/2$ and $-\pi/2$ between successive bits is described.

An object of the invention is therefore to set down a polarization multiplex method which both has good transmission characteristics and can also be implemented with a smaller resource requirement.

Such a method and arrangements for the send side and for the receive side for implementing the method are described in the independent claims.

Advantageous developments of the invention are set down in the dependent claims.

The invention is based on the idea of transmitting two data signals in one channel (at one wavelength) using two modulations which are orthogonal with respect to one another. This saves having to separate the polarized signals on the receive side or complex compensation facilities.

The use of differential phase modulation, which exhibits a considerably enhanced quality of transmission compared with the previously widely used amplitude modulation, is particularly advantageous in achieving a good quality of transmission. Differential phase modulation, DPSK—Differential Phase Shift Keying, is in particular insensitive to changes in the characteristics of the transmission path and the transmission equipment since successive modulation sections (bits) are each compared with one another during the demodulation process. With regard to DPSK, demodulators can be implemented particularly easily without them requiring auxiliary frequencies for the demodulation.

Two data signals can also be modulated orthogonally with respect to one another in the case of phase modulation. Auxiliary frequencies are however required for the demodulation in this case.

For reasons of stability, it is advantageous if both the modulators in the transmitter and also the demodulators in the receiver employ a symmetrical construction as far as possible; for example, so-called "balanced" demodulators are used on the receive side which moreover exhibit an enhanced performance, in particular an enhanced signal-to-noise ratio.

BRIEF DESCRIPTION OF THE DRAWINGS

The invention will now be described in detail with reference to embodiments.

In the drawings:

FIG. 3 shows the schematic diagram of a $\pi/2$ phase modulator/differential phase modulator, FIG. 4 shows a schematic diagram of a parallel $\pi/2$ phase modulator.

DETAILED DESCRIPTION OF INVENTION

Figure 1:
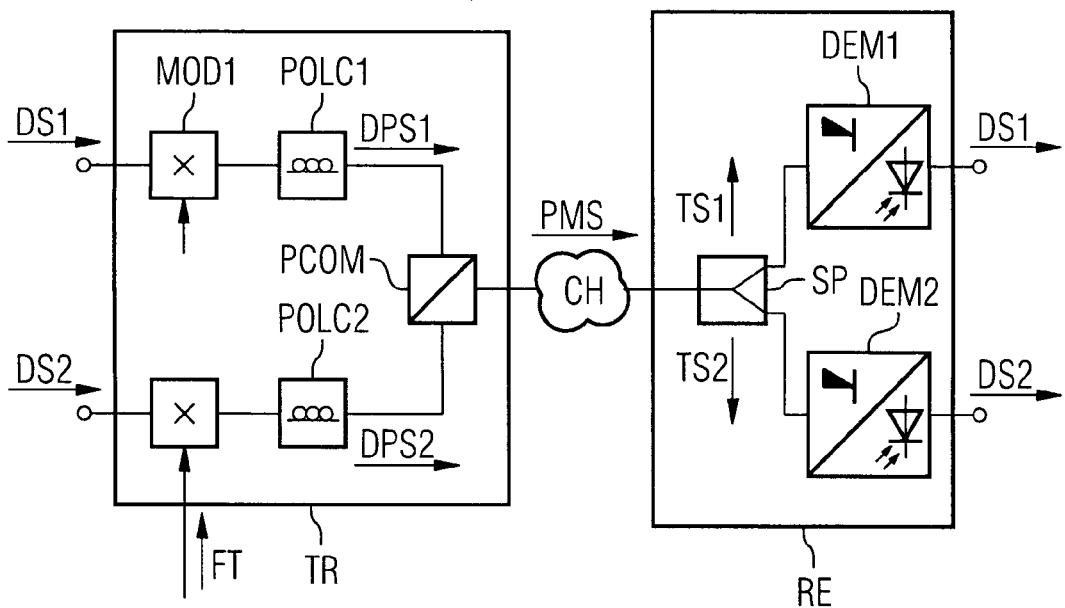
FIG. 1 shows a schematic diagram of a transmission system.

FIG. 1 shows the complete transmission system reduced to its essential elements with a transmitter unit TR, a transmission channel CH and a receiver unit RE.

Two data signals DS1 and DS2 are to be transmitted on one channel of a POLMUX system (polarization multiplex system) with two polarizations P0° and P90° which are each orthogonal with respect to one another. An optical carrier signal FT generated by a laser for example is converted by the first data signal DS1 in a conventional manner in a first modulator MOD1 by means of two-stage differential phase modulation, referred to as DBPSK (B-binary), into a first transmission signal DPS1.

The same carrier signal FT is delivered to a second modulator MOD2 and modulated with the second data signal DS2 DBPSK. However, a modulation "orthogonal" with respect to the first modulation is used, which is referred to here as binary $\pi/2$ differential phase modulation, $\pi/2$ DBPSK for short, (as $\pi/2$ phase modulation in the case of phase modulation). The modulated "$\pi/2$ transmission signal" is polarized orthogonally with respect to the other POLMUX signal and combined with the first transmission signal DPS1 as a second transmission signal DPS2 to form a polarization multiplex signal PMS (POLMUX signal) and is transmitted by way of the POLMUX channel CH.

On the receive side, no polarization setting and splitting into two polarized signals DPS1 and DPS2 is required because the orthogonally modulated transmission signals do not affect one another during the demodulation. The received POLMUX signal is split into two POLMUX partial signals (preferably of the same power) TS1 and TS2 which are fed directly to a demodulator DEM1 or DEM2 respectively. The first demodulator DEM1 is designed for conventional differential phase modulation (or phase modulation) and retrieves the first data signal DS1 from the first POLMUX partial signal TS1. The second transmission signal causes no interference in this situation on account of its orthogonal modulation.

The second data signal DS2 is retrieved from the second POLMUX partial signal TS2. The second demodulator DEM2 must therefore take into account the special demodulation of the second transmission signal DPS2 in order to be able to demodulate the latter, and on the other hand deal with the portions of the first transmission signal DPS1 in such a way that they do not affect the modulation of the second transmission signal DPS2.

Figure 2:
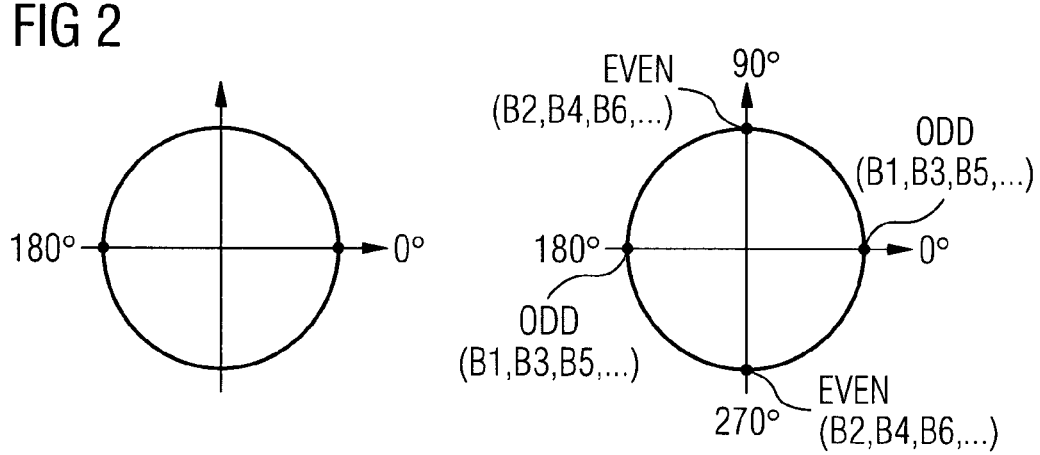
FIG. 2 shows a diagram of the differential phase modulation and a diagram of the $\pi/2$ differential phase modulation.

Transmission by means of orthogonal phase or differential phase modulation will first be generally described with reference to FIG. 2. The left-hand image symbolizes the transmission of binary data using the known phase or differential phase modulation. With regard to binary phase modulation, the information is present in two different phase states of the carrier signal and in the case of differential phase modulation it is present in the phase differential of successive modulation sections; the two phase states are symbolized by the phase 0° and the phase 180°, for example. With regard to differential phase modulation, the bit sequence of the data signal, in other words the sequence of the binary states 0 and 1 to which phase differences of successive modulation sections are assigned is decisive. A logical 0 can thus for example be transmitted by no change in the phase and a logical 1 by a 180° phase change.

The modulation in the lower signal branch of the transmitter unit TR is more complicated. This will be explained with reference to the π/2 DBPSK. It is assumed that a first modulation section (odd) B1 exhibits the phase 0°. Let the next (even) bit again be a logical 0, which would result in retention of the phase during the next modulation section B2 in the case of standard DBPSK. With regard to the π/2 DBPSK used, however, the phase (counterclockwise, for example) is changed by 90° and the second modulation section B2 is transmitted with a phase of 90°. For the next modulation section, the phase is first changed by a further counterclockwise 90°. If a logical 0 is then transmitted again, this phase of 180° remains in effect; if however a logical 1 is transmitted, then an additional phase change of 180° takes place; a modulation section B3 with a phase differential of 360°=0° is then transmitted etc. All the ODD modulation sections B1, B3, B5, . . . therefore exhibit phases of 0° or 180° and all the EVEN modulation sections B2, B4, B4, . . . exhibit phases of 90° and 270°. As will be explained, as a result of these phase differences the second transmission signal DPS2 has no influence on the demodulation of the first data signal DS1 and vice versa.

First, however, the basic structure of a π/2 DPSK modulator will be described with reference to FIG. 3. The second data signal DS2 is fed to a conventional differential phase modulator (or phase modulator) MOD (whereby the inversion of every second bit in the modulo-2 adder M2A will be dealt with later) which converts it into a standard differential phase signal. Every second bit—controlled by a switchover signal US—after passing through a delay element DL—causes an additional phase change of 90° (−π/4; +π/4 or 0; π/2) in a phase modulator PHM connected downstream of the modulator MOD, such that the odd bits are assigned to the phase states 0° and 180°, while the even bits are assigned to the phases 90° and 270°. The modulators MOD and PHM can be replaced by a 4-phase modulator, given appropriate control facilities.

The previously described rotation of the phase by π/2 in each case can be achieved by setting two different phase changes (or delay times) and by inverting every second bit of the data signal, as is described in the following.

The coding rule in a general form is as follows:

$$a_k = b_k a_{k-1} \exp\left(j\frac{\pi}{2}\right) \qquad (1)$$

where $b_k \in \{-1; 1\}$ are the information bits and $a_k \in \{1; \exp(j\pi/2); -1; \exp(-j\pi/2)\}$ are the transmitted symbols for the k-th transmission interval.

By introducing the carrier frequency $f_0$, the transmitted signal pulse p(t) and the signal period T, the following results for the transmitted signal in the k-th modulation interval:

$$s_k(t) = Re\{a_k p(a_k p(t-kT)\exp(j2\pi f_0 t)\}. \qquad (2)$$

By changing the coding rule according to (1) appropriately, the following results:

if k is even $$a_k = b_k a_{k-1}(-1)^k \exp\left[j(2k+1)\frac{\pi}{2}\right] = \left\{ \begin{array}{c} b_k a_{k-1}\exp\left(j\frac{\pi}{2}\right) \\ -b_k a_{k-1}\exp\left(-j\frac{\pi}{2}\right) \end{array} \right\} \qquad (3)$$

if k is odd

By introducing modified transmission symbols $\tilde{a}_k \in \{-1; 1\}$ as $$\tilde{a}_k = b_k \tilde{a}_{k-1}(-1)^k \qquad (4)$$

and modified signal pulses if k is even $$\tilde{p}_k(t) = \left\{ \begin{array}{c} p(t)\exp\left(j\frac{\pi}{4}\right) \\ p(t)\exp\left(-j\frac{\pi}{4}\right) \end{array} \right\} \qquad (5)$$

if k is odd the transmitted signal can be described as $$s_k(t) = Re\{\tilde{a}_k \tilde{p}_k(t-kT)\exp(j2\pi f_0 t)\}. \qquad (6)$$

As expected, this results in a π/2 DPSK modulator whereby the same result is achieved by means of two different settings of the phase modulator instead of a continual rotation in the same direction.

FIG. 4 shows a symmetrically constructed π/2 DBPSK modulator. A laser LA again generates the carrier signal FT which is split in a splitter SP1 onto an upper signal branch ZM1 and a lower signal branch ZM2 of the π/2 DBPSK modulator. The upper modulator MOD1 or the lower modulator MOD2 is switched to active alternately by the switchover signal US by a precoder EC by way of the optical switch OS. The inverter IN here assumes the function of the modulo-2 adder MA2 from FIG. 3. The phases of the modulation sections in each signal branch are 0° or 180°. The phase change of 90° between successive modulation sections is achieved here by means of two fixed phase final control elements (or delay elements) DL1 and DL2 which are connected in the upper signal branch and the lower signal branch respectively. The alternately generated output signals are combined by a second splitter (combiner) SP2 to form the second transmission signal DPS2. The illustration should be regarded as a symbolic representation, the delay can also be achieved by means of an appropriately designed modulator or can also be achieved by only one fixed phase final control element DL1 with a phase displacement of the carrier signal corresponding to $\pi/2$ in one signal branch. Symmetrical arrangements generally have the advantage of a greater stability.

Figure 5:
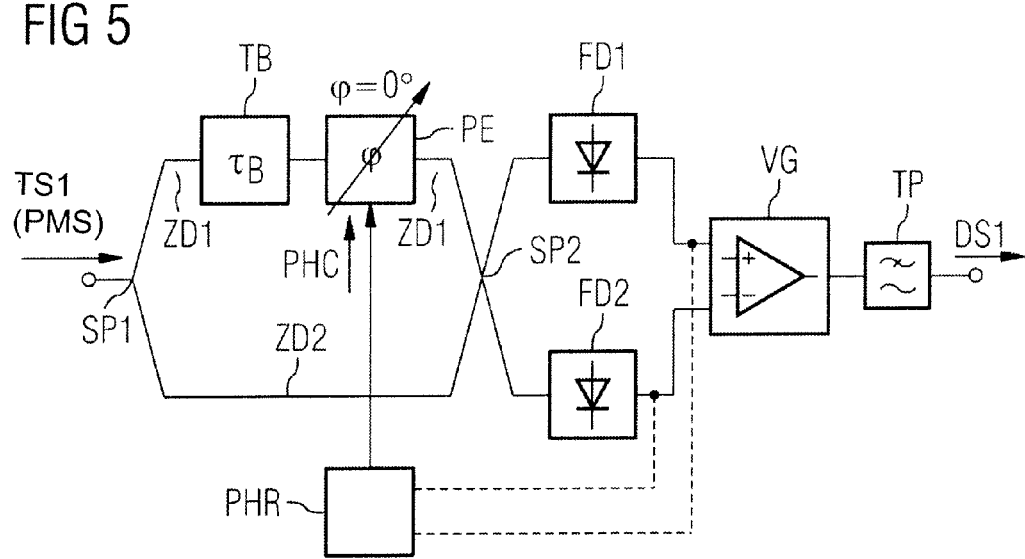
FIG. 5 shows a schematic diagram of a differential phase demodulator.

FIG. 5 shows a known "balanced" demodulator arrangement for DBPSK. This corresponds to an interferometer with symmetrical outputs. The polarization multiplex signal PMS received, which contains both transmission signals DPS1 and DPS2, is split in a first splitter SP3 onto an upper signal branch ZD1 and a lower signal branch ZD2, whereby the phases of these partial signals are different. The series connection of a delay element TB with a delay time TB of one bit length and of a phase final control element PE is arranged in the upper signal branch. The partial signals are overlaid in the output-side splitter. The phase differentials between the overlaid partial signals at the demodulator outputs are 0° and 180°, such that they are added to another in the case of a particular phase difference and are subtracted from one another in the case of a phase difference changed by 180°. This means that as a result of the balanced structure the upper photodiode FD1 will generate a greater voltage while the lower photodiode FD2 generates a smaller (no) voltage and in the other situation the upper photodiode will generate a smaller voltage while the lower photodiode delivers a greater voltage. These "analog" signals are converted back into binary data signals by means of a following comparator circuit VG (differential amplifier) and a low-pass TP connected upstream or downstream of the latter. The orthogonal signal portion of the second transmission signal DPS2 generates voltages of equal sizes in both photodiodes at 90° phase displacement and thus makes no contribution to the demodulated signal.

In order to achieve optimum demodulation, a precise setting of the phase in both signal branches ZD1, ZD2 of the demodulator is required which is effected here by the phase final control element PE and a phase control signal PHC obtained in a phase control unit PHR. The illustration should be regarded as a symbolic representation, the delay element and phase final control element can be implemented as desired.

Figure 6:
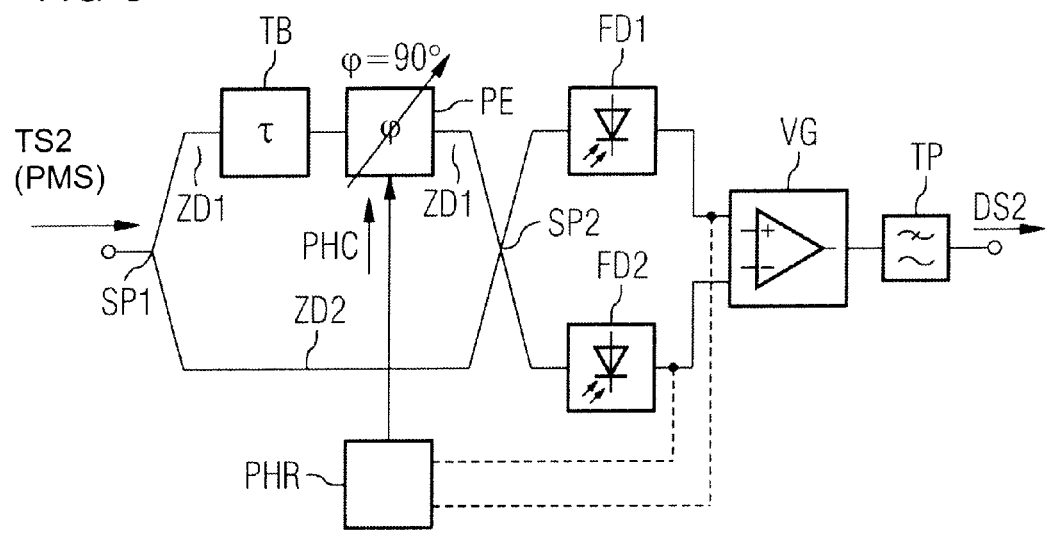
FIG. 6 shows a schematic diagram of a $\pi/2$ differential phase demodulator.

FIG. 6 shows a schematic diagram of the $\pi/2$ DBPSK demodulator which differs from the demodulator represented in FIG. 5 solely in the fact that the phase final control element PE2 effects a phase displacement of 90° which compensates for the transmitter-side phase shift of the transmission signal DPS2 by $\pi/2$ such that the second transmission signal appears at the outputs of the output-side splitter SP4 as an overlay on a standard differential phase modulated signal. A phase control unit PHR should once again be present in order to maintain exact phase relationships.

In principle, the additional phase rotation can also be reversed in a demodulator corresponding to the modulator in order to then perform the demodulation in a conventional DBPSK demodulator. This would however require a bit synchronization and an additional phase modulator with corresponding control facilities. The successive modulation sections of the first transmission signal DPS1 are phase-shifted by 90° with respect to one another by the phase final control element PE2 and thus make no contribution to the demodulated signal.

It should also be noted that this type of transmission exhibits an enhanced signal-to-noise ratio compared with the standard quaternary differential phase modulation as a result of the differential detection and an increased tolerance to phase noise as a result of the maximum phase margin of 180°.

The invention claimed is:

1. A method for the optical transmission of data signals via differential binary
    phase modulation in a polarization multiplex method, comprising:
    modulating, on a send side, an optical carrier signal with a first data signal via a binary differential phase modulation to form a first polarized transmission signal with two phase states differing by 180° and with a first polarization;
    modulating the optical carrier signal with a second data signal via a DBPSK-modulation to form a second polarized transmission signal with a polarization that is orthogonal with respect to the first transmission signal, whose odd modulation sections are transmitted as two phase states differing by 180° and whose even modulation sections are likewise generated as phase states which differ by 180° but which exhibit an additional ±90° phase shift when compared with the odd bits;
    combining the first and second transmission signals to form a polarization multiplex
    signal;
    transmitting the polarization multiplex signal;
    splitting the received polarization multiplex signal into a first and a second POLMUX partial signal via an optical splitter;
    demodulating the first POLMUX partial signal via a DBPSK demodulator; and
    demodulating the second POLMUX partial signal via a $\pi/2$ DBPSK demodulator which compensates for the additional phase shift of the carrier signal.

2. The method as claimed in claim 1, wherein the first DBPSK demodulator and $\pi/2$ DBPSK demodulator have symmetrical outputs.

3. An arrangement for the optical transmission of data signals via a binary differential phase modulation in a polarization multiplex method, comprising:
    a phase modulator that receives a carrier signal and a first data signal and that modulates the received signals via a binary differential phase modulation to generate a first transmission signal with two phase states differing by 180°;
    a $\pi/2$ phase modulator that receives the optical carrier signal and a second data signal and that modulates the received signals to generate a second transmission signal such that successive modulation sections of the second transmission signal vary by a phase difference of ±90° compared with the preceding modulation sections;
    a polarization controller that sets the polarizations of the first and second transmission signals orthogonally with respect to one another; and
    a polarization multiplexer that receives the first and the second polarized transmission signals and combines the signals to form a polarization multiplex signal.

4. The arrangement as claimed in claim 3,
    wherein that the $\pi/2$ phase modulator has a first splitter that splits the carrier signal onto a first signal branch and a second signal branch, wherein the first signal branch has a first phase modulator and the second signal branch has a second phase modulator which are activated alternately in bitwise fashion and generate phase-modulated signals, wherein a phase final control element that changes the phase states of the carrier signal between the first and the second signal branch by 90° is arranged at least in one signal branch, and wherein the first and second signal branches are connected on an output side with inputs to a combiner that combines the phase-modulated signals to form the second transmission signal.

5. An arrangement for receiving an optical data signal that is transmitted via differential phase modulation in a polarization multiplex method and converted back into electrical data signals in phase demodulators, comprising:

an optical splitter splits a received polarization multiplex signal into a first POLMUX partial signal and a second POLMUX partial signal;

a DBPSK demodulator converts the first POLMUX partial signal back into a first data signal;

a $\pi/2$ DBPSK demodulator converts the second POLMUX partial signal back into a second data signal, the $\pi/2$ DBPSK demodulator has an interferometer structure with a first signal branch and a second signal branch; and a phase final control element is arranged at least in one signal branch, whereby a transmission signal modulated by $\pi/2$ DBPSK on the send-side is converted into a conventionally DBPSK-modulated signal.

6. The arrangement as claimed in claim 5, wherein the DBPSK demodulators are balanced and are provided with the signal branches and have symmetrical outputs.

7. The arrangement as claimed in claim 6, wherein the phase final control element causes a phase rotation of $\pi/2$ and is arranged in one signal branch of the $\pi/2$ DBPSK demodulator.

8. The arrangement as claimed in claim 6, wherein a further phase final control element is arranged in a branch of the DBPSK demodulator.

* * * * *